United States Patent [19]

Cherian

[11] Patent Number: 4,487,465
[45] Date of Patent: Dec. 11, 1984

[54] HEAT RECOVERABLE CONNECTING DEVICE

[75] Inventor: Gabe Cherian, Fremont, Calif.

[73] Assignee: Raychem Corporation, Menlo Park, Calif.

[21] Appl. No.: 328,161

[22] Filed: Dec. 7, 1981

[51] Int. Cl.³ .................................. H01R 13/20
[52] U.S. Cl. .................... 339/30; 339/74 R; 339/75 R; 339/258 R; 339/262 R; 339/DIG. 1
[58] Field of Search .............. 339/30, 258 R, 258 P, 339/259 R, 262 R, 262 RR, DIG. 1, 74 R, 75 R, 75 M

[56] References Cited

U.S. PATENT DOCUMENTS

| Re. 29,904 | 2/1979 | Fischer et al. | 29/628 |
|---|---|---|---|
| 1,603,682 | 10/1926 | Gagnon | 339/30 |
| 1,635,832 | 7/1927 | Gagnon | 339/30 |
| 3,244,801 | 4/1966 | Dozier | 339/126 J |
| 3,478,299 | 11/1969 | Ciratl et al. | 339/259 R |
| 3,560,911 | 2/1971 | Zimmerman, Jr. et al. | 339/258 P |
| 3,727,173 | 4/1973 | Goldmann et al. | 339/74 R |
| 3,740,839 | 6/1973 | Otte et al. | 29/628 |
| 3,783,429 | 1/1974 | Otte | 337/393 |
| 3,832,603 | 8/1974 | Cray et al. | 317/101 D |
| 3,861,030 | 1/1975 | Otte et al. | 339/30 |
| 3,913,444 | 10/1975 | Otte | 339/30 |
| 4,022,519 | 5/1977 | Hill | 339/30 |
| 4,040,713 | 8/1977 | Konnemann | 339/259 R |
| 4,045,868 | 9/1977 | Ammon et al. | 29/629 |
| 4,083,623 | 4/1978 | Lynch | 339/258 R |
| 4,219,252 | 8/1980 | Fischer | 339/259 R |
| 4,233,731 | 11/1980 | Clabburn et al. | 339/DIG. 1 |
| 4,237,609 | 12/1980 | Clabburn et al. | 339/DIG. 1 |

FOREIGN PATENT DOCUMENTS

| 250468 | 11/1966 | Fed. Rep. of Germany | 339/259 R |
|---|---|---|---|
| 1234303 | 10/1960 | France | 339/30 |
| 2369706 | 6/1978 | France | 339/DIG. 1 |
| 1429682 | 1/1976 | United Kingdom . | |
| 1579734 | 11/1980 | United Kingdom . | |

OTHER PUBLICATIONS

11th Annual Connector Symposium, Oct. 25-26, 1978, "Low Insertion Force for New Avionic Systems", by Leonard Lacaze and Jack Langenbach.
IBM Technical Disclosure Bulletin, vol. 17, No. 12, May 1975.

Primary Examiner—John McQuade
Assistant Examiner—Gary F. Paumen
Attorney, Agent, or Firm—Ira D. Blecker; James W. Peterson; Herbert G. Burkard

[57] ABSTRACT

A heat recoverable connecting device which utilizes properties of shape-memory metal and method for making such a device is disclosed. The connecting device includes a body made from shape-memory metal capable of reversing between austenitic and martensitic states. The body has at least two arms cantilevered from a support structure which joins the arms. The arms are shaped so that in the martensitic state a substrate may be inserted therebetween to force open the arms with little effort. In the austenitic state, the arms close securely engaging the substrate inserted therebetween. Advantageously, the connecting device includes a second member which forces open the arms of the body in its martensitic state sufficiently to enable a substrate to be inserted in the device with zero force. The arms deform the second member when the body is in the austenitic state sufficiently to engage a substrate inserted in the device.

2 Claims, 11 Drawing Figures

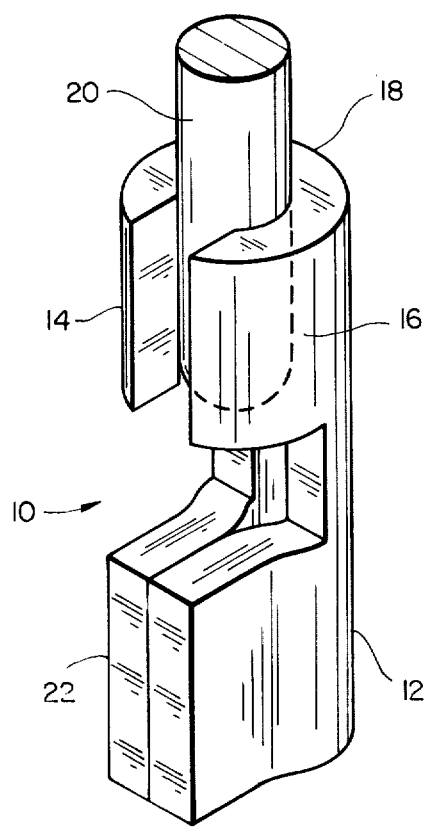
FIG_1
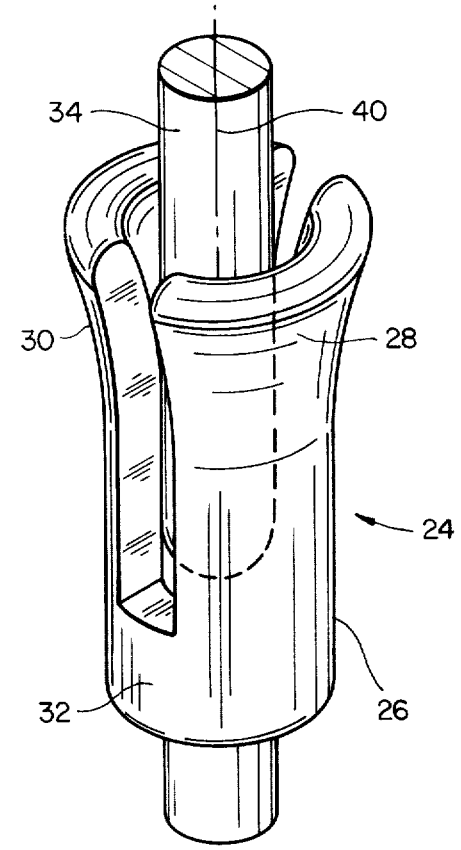
FIG_2
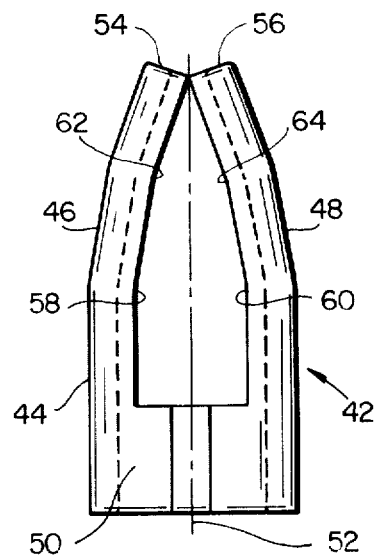
FIG_3

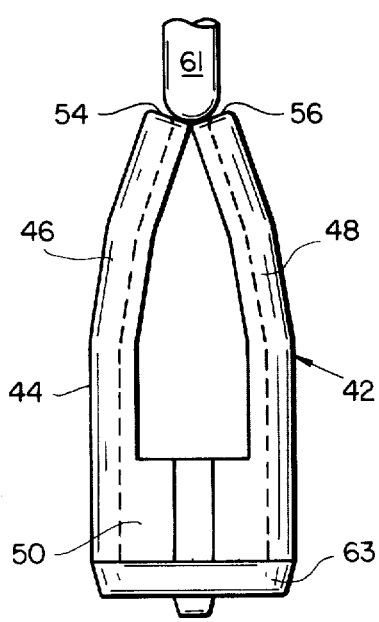
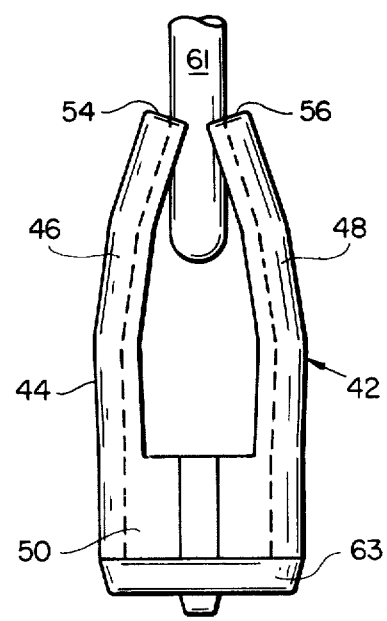
FIG_4A  FIG_4B
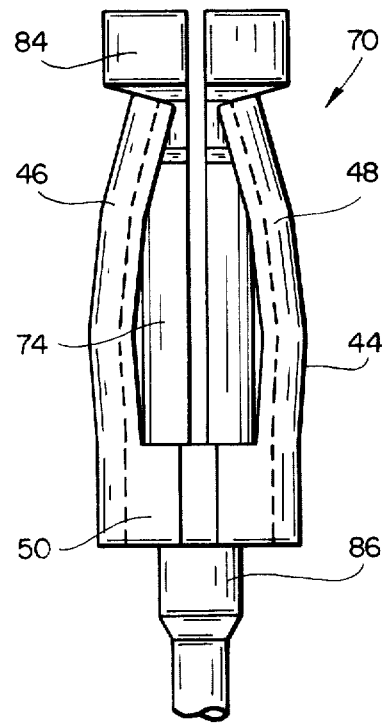
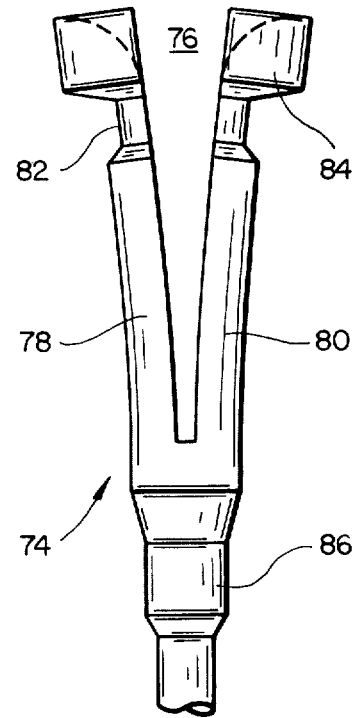
FIG_5A  FIG_5B

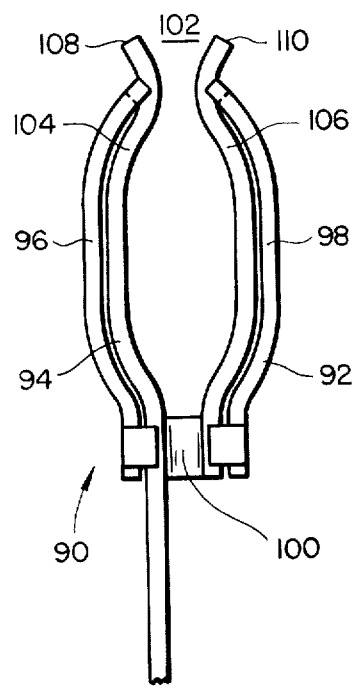
FIG_6
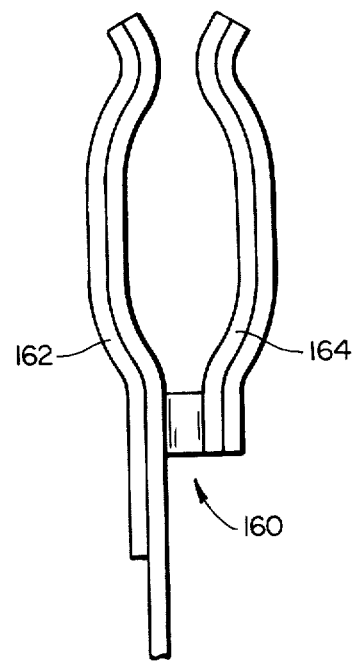
FIG_8
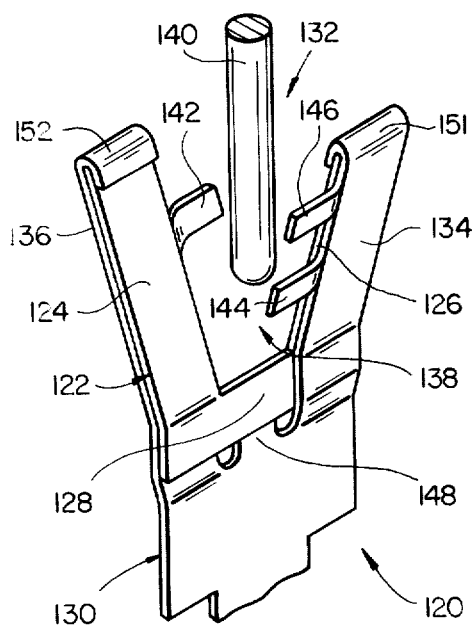
FIG_7A
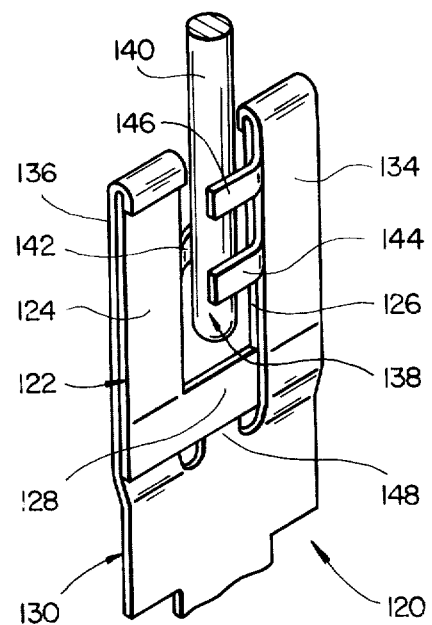
FIG_7B

HEAT RECOVERABLE CONNECTING DEVICE

BACKGROUND OF THE INVENTION

The invention relates to connecting devices and, more particularly, to heat recoverable connecting devices having cantilevered arms.

Connecting devices are necessary in making terminations and connections for electronic packages such as pin grid array packages (PGAP). Current electronic packages often include sixty-four or more pins. The pins may be inserted into sockets in a printed wiring board (PWB) or printed circuit boards (PCB) and then wave soldered for connection therewith.

Prospective users of such boards are concerned that it will be difficult to remove such electronic packages from the board because of the increasing number of pins which are being used. There is a certain amount of force required to insert and remove a pin from a standard socket. With the high count of pins on current electronic packages, the insertion and removal forces can be quite high. In fact, the number of pins may be so great that the electronic package itself may become damaged during insertion or removal. In order to avoid damaging the electronic package, it is desirable to have pins which can be attached or removed from sockets with low or zero force.

There are zero insertion force connectors currently available, e.g. the connector disclosed in OTTE et al, U.S. Pat. No. 3,740,839 (hereinafter Otte et al). The Otte et al connector discloses a ring which is made from material capable of reversing between austenitic and martensitic states and a second member encircled by the ring. The second member deforms the ring when the ring is in its martensitic state and is deformed by the ring when the ring is in its austenitic state. The ring increases and decreases in diameter for releasing or engaging a substrate inserted within the second member. A more detailed description of the above mentioned phenomena is found in U.S. Pat. Nos. Re. 29,904; 3,740,839; and 4,022,519 all of which are incorporated herein by reference.

The instant invention is an improvement over the above described connectors in that it eliminates the ring construction and it's inherent tolerance and manufacturing problems. The instant cantilevered arms are constructed to provide an effective connector having a large range of movement for pin accomodation. It can be appreciated that such an arrangement requires fairly sophisticated manufacturing techniques and that the components must be made within narrow tolerance limits.

SUMMARY OF INVENTION

The instant invention provides a heat recoverable connecting device and a method for making same. The heat recoverable connecting device includes a first low insertion force alternative and a second zero insertion force alternative.

The low insertion force (hereinafter LIF) connecting device alternative includes a body of shape-memory metal which is capable of reversing between martensitic and austenitic states. The body has at least two arms cantilevered from a support structure which joins the arms. The arms are cantilevered to create the maximum amount of articulation thereof as the device reverses from one state to another. In its martensitic state the arms of the body are sufficiently weakened allowing a substrate to be inserted therein with low insertion force. After insertion of a substrate, the body may be warmed (or the cooling force merely removed) to return to the body to its austenitic state wherein the arms articulate to become closely spaced for engaging a substrate inserted therein.

Especially important is that the device in accordance with this invention may be advantageously made by a stamping process. When the device is made by a stamping process, the support structure for joining the arms is of split construction. The support structure may also be flat as will be explained more fully hereinafter.

The LIF connecting device which is stamped preferably includes arms which, when in the austenitic state, are bent and then folded to confront each other. With the arms so bent and then folded, greater pressure can be exerted by the arms on a substrate inserted therein, thereby providing better contact of the device with the substrate, which is especially important in electrical applications. Even in the non-stamped version, the arms may be over-bent such that they make pressing contact with at least one other arm, preferably along the vertical center line of the body. The over-bending is such that if one arm were removed, its confronting arm would bend over the vertical center line of the body. This additional bending causes preloading of the arms which ensures even better contact of a substrate with the device because of the additional pressure exerted by the arms on the substrate.

The zero insertion force (hereinafter ZIF) connecting device includes a driver member similar to the LIF connecting device body having cantilevered arms for maximum articulation thereof as the body reverses from one state to another. The ZIF device includes a second member which has at least one female end. The female end normally diverges to an open condition for receiving a substrate. The female end is capable of being deformed to a closed condition when the driver member is connected to the second member. Advantageously, the female end of the second member sufficiently forces open the arms, with the driver member is in its martensitic state, to allow a substrate to be inserted therein with zero force. The arms, with the driver member is in its austenitic state, forces the female end of the second member to its closed condition, sufficiently, for the device to engage a substrate inserted therein.

In one embodiment of a ZIF device in accordance with this invention, the driver member surrounds the second member. In this embodiment the female end includes at least two legs which push open the arms, with the driver in its martensitic state, to allow a substrate to be inserted therein. As the driver member approaches the austenitic state, the arms push the legs of the female end to its closed condition to engage a substrate therein.

The above described embodiment of a ZIF connecting device preferably includes a female end having at least two normally diverging spread apart resilient legs. The legs preferably include a terminus defining an enlarged end zone for receiving and properly locating a substrate therein. The end zone advantageously includes an outer surface having an annular recess defining a gripping means for securely connecting the driver and the second member.

In another embodiment of a ZIF device in accordance with this invention, the arms of the driver member are connected to the inside surface of a corresponding leg of the female end. In this embodiment, the driver member preferably has two arms and female end of the second member has two legs. By necessity, in this embodiment, there must be a corresponding number of legs and arms. The arms are bent, with the driver member in its austenitic state, to diverge the arms from one another. The arms are thereafter reverse bent, with the driver member in its martensitic state, to again diverge the arms from one another, but this time with the arms in the opposite relative position. Each arm of the driver member is connected to its corresponding leg of the second member with the driver member in its martensitic state. Each leg member advantageously includes means for such connection. In this embodiment, the legs pull the arms open, with the driver member in its martensitic state, and the arms pull the legs to a closed condition, with the driver member in its austenitic state, precisely the reverse of the earlier described embodiment.

In any of the LIF or ZIF devices heretofore or hereinafter discussed, one end of either the driver member, body or second member advantageously includes a male end which is adapted for connection to a printed circuit or printed wiring board.

Cantilevered arms have much greater articulation (a larger percentage of deformation) from austenitic to martensitic states and vice versa than the earlier described Otte et al connector ring. In other words, the amount of deformation caused by a shift from martensitic to austenitic states and vice versa is much greater in the instant invention than the earlier described connector. The greater deformation reduces the narrow tolerance limits for making heat recoverable connecting devices of memory metal thereby greatly reducing the cost of manufacture. Additionally there is greater flexibility in making a particularly shaped device than previously possible. For example, the ZIF connecting device in accordance with this invention is made to accommodate the standard JEDEC pin having tolerance limits of plus or minus 0.0005 inches.

Additionally, the heat recoverable connecting device in accordance with this invention is preferably made by a process which includes a sizing operation further reducing the need for narrow tolerance limits.

The instant invention is preferably made by a stamping process, a far less expensive process than is currently used for making memory metal connecting devices. Additionally, the instant invention may be made from drawn Tinel TM tubing, also a less expensive process than is currently used for making such devices.

Other objects and advantages of this invention will be described or will be appreciated more fully hereinafter with reference to the detailed description of the preferred embodiments shown in the accompanying Drawing wherein:

BRIEF DESCRIPTION OF THE DRAWING

FIG. 1 illustrates, in perspective, a low insertion force connecting device in accordance with this invention.

FIG. 2 illustrates, in perspective, another embodiment of a low insertion force connecting device in accordance with this invention.

FIG. 3 illustrates a third embodiment of a low insertion force connecting device in accordance with this invention.

FIGS. 4A and 4B illustrate the operation of a stamped low insertion force connecting device in accordance with this invention.

FIGS. 5A and 5B illustrate one embodiment of a zero insertion force connecting device in accordance with this invention.

FIG. 6 illustrates another embodiment of a zero insertion force connecting device in accordance with this invention.

FIGS. 7A and 7B illustrate a third embodiment of a zero insertion force connecting device in accordance with this invention.

FIG. 8 illustrates a laminate embodiment of a zero insertion force connecting device in accordance with this invention.

DETAILED DESCRIPTION OF THE PREFERRED EMBODIMENTS

The invention is a heat recoverable connecting device which may alternatively be of the low insertion force type or the zero insertion force type. The low insertion force alternative includes a shape-memory metal body having at least two arms centilevered from a support means for joining the arms. The zero insertion force embodiment includes a shape-memory metal body (defining a driver member) as described above and a second member which spreads apart the arms of the driver member, with the driver member in its martensitic state, for insertion of a substrate therein. As the driver member is warmed to its austenitic state, the arms of the driver member cause the second member to engage a substrate inserted therein. A detailed description of the preferred embodiments of each of the above mentioned alternatives follows.

LOW INSERTION FORCE CONNECTING DEVICE

With reference to the Drawing wherein like reference characters designate like or corresponding parts throughout the several views and referring particularly to FIG. 1, there is shown a heat recoverable connecting device in accordance with this invention generally denoted by the reference numeral 10. The device includes a body 12 made from shape-memory metal material capable of reversing between martensitic and austenitic states. The body is preferably made from Tinel TM; however, all shape-memory alloys having the properties discussed in Otte et al which is incorporated herein by reference, can be used.

The body has two arms 14 and 16 cantilevered from a support 18 which joins the arms. The body 12 is formed by a stamping process and the arms 14 and 16 are folded at the support 18 until the arms 14 and 16 are in confronting relation with each other with the body 12 in its austenitic state. The arms are spaced apart from one another, in the austenitic state, a distance not greater than the cross sectional width of a substrate to be inserted therein. For the purposes of this invention, the cross sectional width refers to that dimension of a substrate which contacts the arms of the body (or driver or second member as will be appreciated more fully hereinafter). It will be appreciated that this dimension could be a substrate's width where the substrate is a rectangular or its diameter where it is cylindrical, as is the case with substrate 20 shown in FIG. 1 or it may be an undefinable dimension in the case of an irregularly shaped substrate. In any case, the arms 14 and 16 are spaced so that when the body 12 is in its austenitic state, they contact the substrate. The arms 14 and 16 are advantageously spaced apart a distance less than the cross sectional width of the substrate 20 to ensure secure engagement of the substrate 20 with the device 12, which is especially important in electrical connections.

As is understood and as is explained in more detail in U.S. Pat. Nos. 3,740,839; 4,022,519 and Re. 29,904, which are all incorporated herein by reference, when a shape-memory metal body is in its martensitic state, the body is in a weakened condition. Hence, with the body 12 in its martensitic state, the substrate 20 easily (with low force) spreads apart the arms 14 and 16 as it is inserted therein. Upon the body 12 returning to its austenitic state, the arms 14 and 16 attempt to return to their position where they were spaced apart a distance less than the cross sectional width (diameter) of substrate 20. However, since the substrate 20 has been inserted between the arms 14 and 16, the original austenitic position is not possible. Thereby, the confronting arms 14 and 16 exert a continuous force against the substrate 20 securely engaging the substrate 20 to device 10 with the body 12 in its austenitic state.

It will be appreciated that support 18 need not exert any force to engage the substrate 20. However, where the support is curved as shown in FIG. 1, the support will exert a small force against a substrate with the body 12 in its austenitic state.

The connecting device 10 also includes a male end 22 which is adapted for connection with a printed circuit board.

With particular reference to FIG. 2, there is shown another embodiment of a heat recoverable LIF connecting device generally indicated by the reference numeral 24, formed by a screw machine operation. As in the previous embodiment 10, the embodiment 24 includes a body 26 having at least two arms 28 and 30 cantilevered from a support 32 which joins the arms. Similarly, the body 26 is made from the same material as recited above with respect to device 10. Similarly, the support 32 does not necessarily act to engage substrate 34 which is inserted between arms 28 and 30, rather the arms 28 and 30 provide the necessary force for engaging substrate 34. The arms 28 and 30 are formed about vertical axis 40 and are bent inwardly, with the body 26 in its austenitic state, to create a force by the arms against the substrate 34 for securely engaging it to device 24.

With particular reference to FIG. 3, there is shown a third embodiment of a heat recoverable LIF connecting device generally indicated by the reference numeral 42. As in the earlier described embodiments, the device 42 has a body 44 having two arms 46 and 48 cantilivered from a support 50 which joins the arms. The embodiment 42 is stamped, which allows the arms to be severely bent before being folded to confront one another. The arms 46 and 48 are over-bent, with the body 12 in its austenitic state, and then folded to confront one another. The bend is such that if arm 46 were removed, confronting arm 48 would bend over vertical center line 52. The arms 46 and 48 are bent, with the body 12 in its austenitic state, to achieve equilibrium along the vertical center line 52 with the ends 54 and 56 of the arms 46 and 48, respectively, in pressing contact thereby preloading the arms.

The arms 46 and 48 are bent by a multi-step process while the body is in its austenitic state. The first bend is made at points 58 and 60 of each of the arms 46 and 48, respectively, approximately at the one third point of each of the arms. A second bend is made at points 62 and 64 of each of the arms 46 and 48, respectively, approximately at the two thirds point of the arms. The bending is made with a mandrel (not shown) while the driver is still a sheet.

With particular reference to FIGS. 4A and 4B, there is shown the operation of connecting a substrate 61 to a heat recoverable LIF connecting device in accordance with this invention. The LIF device 42 of the instant invention is used herein for discussion purposes only. It will be appreciated that the operation of connecting a substrate to any LIF connecting device in accordance with this invention is generally the same.

The LIF connecting device 42 is cooled to its martensitic state by appropriate means, including cryogenic means which are described more fully in Fischer et al, U.S. Pat. No. Re. 29,904, supra. With the body in its martensitic state, the arms are in a weakened condition. As the substrate 61 is inserted into the LIF connecting device 42, ends 54 and 56 are spread apart. The force required for such spreading is low due to the weakened condition of the arms. The exact insertion force is dependent upon the materials used for making the device and the substrate. The exact insertion force (F) necessary to insert a substrate between the arms of a LIF connecting device in accordance with this invention equals twice the co-efficient of friction ($\mu$) of the material used for making the arms, times the normal force (N) exerted by the arms. It will be appreciated that the normal force (N) exerted by the arms is increased by bending of the arms and especially increased where the arms are preloaded as in device 42.

After insertion of the substrate 61 within the arms 46 and 48, the body 44 is recovered to its austenitic state by applying heat or merely removing the cooling force. The arms 46 and 48 tend to recover to their original condition with the ends 54 and 56 in pressing contact. Instead, the ends 54 and 56 exert a normal force (N) against the substrate 61 for securely engaging the substrate to the device 42. Good contact between substrate and device is especially important in electrical connections. Since the arms never fully recover, a normal force (N) is constantly exerted by the arms 46 and 48 against the substrate with the body 44 in its austenitic state. This constant normal force assures good electrical contact between the device 42 and substrate 61.

The preferred LIF connecting device 42 includes a male end 63 which is suitable for connection with a printed circuit board or the like.

It will be appreciated that any of the above described LIF connecting devices could be adapted to engage a superstrate having an opening. The arms of the LIF device are bent so that in the martensitic state, the device is inserted within the opening of the superstrate with low force. Upon shifting to its austenitic state the arms articulate as earlier described, and engage the opening of the superstrate.

ZERO INSERTION FORCE CONNECTING DEVICE

With particular reference to FIGS. 5 through 8, there are shown various preferred embodiments of a zero insertion force (ZIF) connecting device in accordance with this invention. The operation of the ZIF connecting device is similar to that of the LIF connecting device above described. However, unlike the previously described LIF connecting device, the ZIF connecting device includes a second member which spreads apart the arms of the earlier described body (now defining a driver member), with the body in its martensitic state. With the arms of the device in a spread apart condition prior to insertion of a substrate, the ZIF connecting device may receive a substrate with zero insertion force. The second member must, of course, be of sufficient strength to diverge the arms, with the driver in its martensitic state. As will be appreciated, the arms and the diverged end of the second member must be diverged or opened at least as great as the cross sectional width of a substrate, to enable such a substrate to be inserted therein with zero insertion force.

With particular reference to FIGS. 5A and 5B there is shown one embodiment of a ZIF connecting device generally indicated by the numeral 70. With particular reference to FIG. 5B, there is shown the preferred form of the second member generally indicated at 74. The second member 74 defines a socket having a female end 76. It will be appreciated that the second member 74 could have a female end at either end in another embodiment. The female end 76 is bifurcated by cutting longitudinal slots therein. The female end 76 normally diverges to an open condition shown in FIG. 5B. The female end 76 is made of resilient material which is deformable so that the female end 76 can be converged or collapsed to a closed condition by a driver member.

The female end 76 has two normally diverging legs 78 and 80. It will be appreciated that legs 78 and 80 must have sufficient diverging strength to spread apart the arms of a driver member with the driver member in its martensitic state, to achieve an open condition wherein the legs are apart a distance at least as great as the cross sectional width of a substrate to be inserted therein. In the device 70, the body 44 is used as the driver member. The legs 78 and 80 of the second member 76 spread apart the arms 46 and 48, respectively, with the driver in its martensitic state. With the legs 78 and 80 in this open condition, a substrate may be inserted therein with zero force.

The driver member 44 is connected to the second member 74 with the driver member 44 in its martensitic state. The second member 74 has a male end 80, which is inserted through legs 46 and 48 of the driver member, with the driver member in its martensitic state, in the manner previously described with respect to connecting a substrate to an LIF connecting device. The driver member may then be warmed to its austenitic state whereupon the driver member securely engages the second member 74.

The second member 74 has an enlarged end zone 84 with an outside surface having an annular recess 82. As the driver shifts to its austenitic state, the ends 54 and 56 of arms 46 and 48, respectively, engage the recess 82, assuring secure connection between the driver member and second member 74. It will be appreciated that such a recess is not necessary since the arms 46 and 48 will engage the female end legs 78 and 80, anyway. The recess 82 defines a gripping means for properly locating and assuring secure engagement between driver and second members 44 and 74, respectively. The enlarged end zone 84 of the female end 76 encourages correct entry and positioning of a substrate therein.

The female end 76 is deformable to a closed position. When the driver member shifts to its austenitic state, the arms 46 and 48 force the legs 78 and 80 of female end 76 to close about a substrate inserted therein. The arms 46 and 48 attempt to recover to their austenitic position, but are prevented from doing so because legs 78 and 80 and a substrate inserted therein are between the arms. The arms 46 and 48, with the driver member in its austenitic state, possesses sufficient strength to converge the legs to their closed condition, wherein the legs contact the substrate. As a result of the preloading, described earlier, a constant normal force (N) is exerted by arms 46 and 48 upon the legs 78 and 80, which creates good contact between the second member 74 and the substrate inserted therein. The other end of the second member 74 is a male end 86 which is sized and shaped compatible for connection with a printed circuit board.

With particular reference to FIG. 6 there is shown another embodiment of a ZIF connecting device generally indicated by the reference numeral 90. As in the earlier described embodiment of the ZIF connecting device 70, the device 90 includes two members, a driver member 92 of heat recoverable metal capable of reversing between a martensitic and an austenitic state and a second member 94 which is suitable for connection with a substrate and the driver member 92.

The driver member 92 includes two arms 96 and 98 which are cantilevered from a support 100 which joins the arms. As will be appreciated from earlier discussion, it is not necessary for the support 100 to grip either a substrate or in this case the second member 94 for the device 90 to function properly. Rather, the support 100 supports and joins the cantilevered arms 96 and 98 which articulate upon temperature change similar to previously described body 44 and the driver member of device 70.

Also, similar to earlier described second member 74, second member 94 includes a diverging female end 102. The female end 102 includes two diverging legs 104 and 106 which have outwardly turned ends 108 and 110, respectively. The outwardly turned ends serve the purpose similar to that served by the enlarged end zone 84 previously discussed, namely for correctly positioning a substrate upon entry and thereafter between legs 104 and 106.

As will be appreciated the embodiment 90 shown in FIG. 6 works in exactly the same manner as described earlier with reference to device 70. However, it will be appreciated from viewing FIG. 6 that the second member 94 is stamped instead of machined or screw turned as would be the case in the earlier discussed embodiment 74. Thus, the device 90 shown in FIG. 6 is particularly advantageous since it will perform precisely the same functions as described earlier, however, the members 92 and 94 are more efficiently manufactured by a stamping process. Additionally, the arms 94 and 96 are severely bent for preloading in the same manner described with reference to body 44 (FIG. 3).

With particular reference to FIGS. 7A and 7B, there is shown a third embodiment of a ZIF connecting device generally indicated by the reference numeral 120. The operation and structure of this connecting device is similar to the earlier discussed embodiment 90 with the exception that a driver member is on the inside of a second member. The driver member pulls the connecting device 120 closed in its austenitic state, while the second member pulls the connecting device 120 open in the martensitic state, precisely opposite of the earlier discussed ZIF connecting devices 70 and 90. Additionally, the legs of the driver and second members are not in line with one another as in the earlier discussed embodiment.

The ZIF connecting device 120 includes two members, a driver member 122 made from shape-memory metal capable of reversing between austenitic and martensitic states and second member 130. Similar to the earlier discussed embodiment 90, the driver member 122 includes cantilevered arms 124 and 126 joined by a support 128. In this embodiment, the arms 124 and 126 are stamped from a blank and are then bent while in austenitic state to a position where the arms diverge from one another. The driver member 122 is then cooled to its martensitic state and the arms are bent in the reverse direction, but this time with arms in the opposite position. With the arms in this reverse bent martensitic position, the driver 122 is installed on the second member 130.

The second member 130 is similar to earlier discussed second member 94 and includes a female end 132. The female end 132 has diverging legs 134 and 136 with sufficient diverging strength to hold open arms 124 and 126, respectively, in the reverse martensitic bent position. After a substrate 140 is inserted between legs 134 and 136, the driver member 122 is warmed to its austenitic state for securely engaging a substrate inserted therein as shown in FIG. 7B.

The second member 130 includes engagement means 138 for contacting the female end 132 with the substrate 140. Of course, the driver member 122 could include additional means for contacting the substrate or, in fact the sole means for contacting the substrate or, in fact the sole means for doing same as will be explained more fully hereinafter. The engagement means 138 includes inwardly extending teeth 142, 144 and 146. Leg 134 includes teeth 144 and 146 appropriately spaced apart. Leg 136 includes a single tooth 142 which is positioned so that, with the female end 132 in the closed position, tooth 142 is situated between teeth 144 and 146, as shown. The driver member 122 exerts a constant force in its austenitic state upon the female end 132 and substrate 140, assuring good contact therebetween.

The second member 130 includes an abuttment shoulder 148 along the surface which joins the diverging legs 134 and 136. The abuttment shoulder 148 is used for positioning of the driver member 122 for connection to the second member 130. Additionally, support 128 which joins the arm 124 and 126 defines a means for stopping a substrate inserted therein. The driver member 122 is connected to the second member 130 with the support 128 contacting the abuttment shoulder 148, thereby correctly positioning the members with respect to one another. Using the support 128 as a stop means, a substrate inserted therein is correctly positioned in device 120.

Legs 134 and 136 of the second member 130 have inwardly turned ends 151 and 152, respectively, for capturing the driver member 122. The ends 151 and 152 are turned inwardly and spaced from the inside surface of their respective legs 134 and 136, a distance approximately equal to the thickness of the driver member 122. Of course, other means for connecting the members 122 and 130 are possible.

In operation, the diverging female end 132 is of sufficient strength to pull the arms 124 and 126 open with the driver in its martensitic state. The legs 134 and 136 spread the arms 124 and 126 apart a distance greater than the cross sectional width of a substrate so that same is inserted therein with zero insertion force. Additionally, the female end 132 is deformable by the driver member 122 so that as the driver member warms to its austenitic state, the substrate 140 inserted therein is engaged by teeth 142, 144 and 146.

With particular reference to FIG. 8, there is shown a laminate version of a ZIF connecting device in accordance with this invention generally indicated at 160. As in the earlier described device 90, the device 160 includes a driver member 162 and a second member 164. The operation of the devices 90 and 160 is identical. The structure of the devices 90 and 160 is generally the same except device 160 has its driver member 162 laminated to its second member 164.

The above described ZIF connecting device in accordance with this invention includes a second member having a male end suitable for connecting with a printed circuit (PC) board or the like. As is known, Tinel ™ material, as well as other shape-memory metals, do not solder particularly well. Therefore, it is preferred to make the second member with the male end. However, Tinel ™ material does conduct electricity and could be specially soldered to a PC board within the spirit and scope of this invention. Also, as will be understood, no male end is necessary for the broad purposes of the instant invention.

It will be appreciated that any of the above described ZIF connecting devices could be adapted to engage a superstrate having an opening. The legs of the second member holds the arms of the driver such that in the martensitic state, the device is inserted within the opening of the superstrate with zero force. Upon shifting to its austenitic state the arms articulate as earlier described, and the device engages the opening of the superstrate.

METHOD OF MAKING CONNECTING DEVICES IN ACCORDANCE WITH THIS INVENTION

The instant invention includes a method for making heat recoverable LIF and ZIF connecting devices which includes the steps of providing a sheet of shape memory metal capable of reversing between a martensitic and an austenitic state, stamping a blank from the sheet, forming the blank into a body having at least two arms cantilevered from a support means for joining the arms, and folding the arms with the body in its austenitic state, such that when a substrate is inserted therein it contacts the arms. In the preferred method, the arms are bent so that they are spaced apart a distance no greater than the cross sectional width of such a substrate, and preferably less than that dimension, with the body in its austenitic state. The preferred method additionally includes the step of severely bending the arms to preload the arms, with the body in its austenitic state, as described earlier with reference to body 44 (FIG. 3).

The instant invention also includes a method for making heat recoverable ZIF connecting devices which includes the steps of providing a sheet of shape-memory metal capable of reversing between a martensitic state and an austenitic state, stamping a blank from the sheet and forming from the blank a driver member having at least two arms cantilevered from a support means for joining the arms. Thereafter, folding the above formed arms, with the driver member in its austenitic state, such that the arms are a distance apart no greater than the cross sectional width of a substrate to be inserted therein with the driver member in its austenitic state. Thereafter, connecting a second member to the driver member. The second member includes a normally diverging female end having sufficient diverging strength to spread apart the arms, with the driver member in its martensitic state, a distance at least equal the cross sectional width of a substrate inserted therein and the female end being deformable to a closed condition by the arms, with the driver member in its austenitic state, such that the device contacts such a substrate.

The method for making zero insertion force connecting devices preferably includes diverging the arms of the driver member in one direction, with the driver member in its austenitic state, and thereafter reverse bending the arms of the driver member in the martensitic state so that the arms again diverge from each, but this time in the opposite direction. Thereafter, connecting the driver member to the inside of an appropriately stamped second member.

While the instant invention has been described by reference to what is believed to be the most practical embodiments, it is understood that the invention may embody other specific forms not departing from the spirit of the invention. It should be understood that there are other embodiments which possess the qualities and characteristics which would generally function in the same her specific forms not departing from the spirit of the invention. It should be understood that there are other embodiments which possess the qualities and characteristics which would generally function in the same manner and should be considered within the scope of this invention. The present embodiments therefore should be considered in all respects as illustrative and not respective, the scope of the invention being limited solely to the appended claims rather than the foregoing description and all equivalents thereto being intended to be embraced therein.

What is claimed:

1. A heat-recoverable connecting device, comprising:
    a generally planar sheet of shape-memory metal capable of reversing between a martensitic state and an austenitic state defining a driver member including at least two generally parallel arms and an interconnecting support, the arms being cantilevered from the support for movement out of the plane of the sheet; and
    a second member connected to said driver member, said second member having at least two resilient legs diverging from the plane of said driver member, said second member further including engagement means to contact and exert a high engaging force on a substrate that may be inserted between said legs when said legs are moved toward the plane of said driver member back toward each other, said resilient legs capable of bending said arms out of the plane of the driver member in opposite directions with respect to the plane of the driver when the metal of the driver member is in the martensitic state, said arms capable of overcoming said bending when the metal of said driver member is in the austenitic state to cause engagement means to contact and exert a high engaging force on such a substrate.

2. A heat-recoverable connecting device, comprising:
    a body of shape-memory metal capable of reversing between a martensitic and an austenitic state, the body having at least two arms wherein each arm includes an end and each end is bent severely inwardly and is in touching contact with at least one other arm for preloading the arms and a support means wherein the support means comprises a split ring, the arms being cantilevered from the support means for joining the arms, the arms capable of being bent so that a substrate may be inserted between the arms when the body is in its martensitic state and the arms capable of directly contacting and exerting a high engaging force on a substrate that may be inserted between the arms when the body is in its austenitic state wherein the arms confront each other with the body in its austenitic state.

* * * * *